(12) United States Patent
Wiser et al.

(10) Patent No.: US 6,330,675 B1
(45) Date of Patent: Dec. 11, 2001

(54) SYSTEM AND METHOD FOR SECURE TRANSFER OF DIGITAL DATA TO A LOCAL RECORDABLE STORAGE MEDIUM

(75) Inventors: Philip R. Wiser, Redwood City; Andrew R. Cherenson, Los Altos; Tze-Yee Szeto, Santa Cruz, all of CA (US)

(73) Assignee: Liquid Audio, Inc., Redwood City, CA (US)

( * ) Notice: Subject to any disclaimer, the term of this patent is extended or adjusted under 35 U.S.C. 154(b) by 0 days.

(21) Appl. No.: 09/023,505

(22) Filed: Feb. 13, 1998

(51) Int. Cl.⁷ ........................................................ H04L 9/00
(52) U.S. Cl. .................. 713/189; 713/195; 713/200; 380/42; 380/201; 705/51
(58) Field of Search .................. 380/201, 42; 713/189, 713/193, 200; 705/51

(56) References Cited

U.S. PATENT DOCUMENTS

| | | | | |
|---|---|---|---|---|
| 5,381,480 | * | 1/1995 | Butter et al. | 380/37 |
| 5,418,713 | | 5/1995 | Allen | 364/403 |
| 5,636,276 | * | 6/1997 | Brugger | 380/4 |
| 5,734,823 | | 3/1998 | Saigh et al. | 395/200.06 |
| 5,734,891 | | 3/1998 | Saigh | 395/610 |
| 5,794,217 | | 8/1998 | Allen | 705/27 |
| 5,805,706 | * | 9/1998 | Davis | 380/49 |
| 5,883,957 | * | 3/1999 | Moline et al. | 380/4 |

\* cited by examiner

*Primary Examiner*—Albert Decady
*Assistant Examiner*—Paul E. Callahan
(74) *Attorney, Agent, or Firm*—James D. Ivey

(57) ABSTRACT

A device securely decrypts and writes an encrypted digital file to a local recordable storage medium. The device uses two decryption engines. The first decryption engine incrementally decrypts the encrypted digital file, which is then preprocessed and re-encrypted to form an intermediate file. The second decryption engine then incrementally decrypts the intermediate file and writes the decrypted results to a local recordable storage medium. Both decryption engines perform incremental decryption, such that substantially less than all of the digital file is in decrypted form at any instant. A device in accordance with a second embodiment includes a single decryption engine. The encrypted digital file includes individually encrypted portions, and the decryption engine incrementally decrypts the encrypted portions. These portions are buffered for subsequent writing to the recordable storage medium, but substantially less than all of the individually encrypted portions are stored in decrypted form at any instant.

11 Claims, 8 Drawing Sheets

SYSTEM AND METHOD FOR SECURE TRANSFER OF DIGITAL DATA TO A LOCAL RECORDABLE STORAGE MEDIUM

CROSS-REFERENCES TO RELATED APPLICATIONS

The subject matter of this application is related to the subject matter of U.S. patent application Ser. No. 09/020,023 entitled "Secure Online Music Distribution System" filed on Feb. 6, 1998, by Philip R. Wiser, Andrew R. Cherenson, Steven T. Ansell, and Susan A. Cannon. This application is incorporated herein by reference in its entirety.

BACKGROUND OF THE INVENTION

1. Field of the Invention

This invention relates generally to tile secure transfer of digital data, and more particularly, to the transfer of digital data to a local recordable storage medium while securing the transfer against unauthorized copying of the data.

2. Description of the Related Art

As a result of the continuous development of technologies, particularly in the areas of networking and communications, there has been an explosion of interest and activity in networked computer systems such as the Internet. The global growth and acceptance of networks such as the Internet has resulted in new business opportunities and new models for commerce.

One such opportunity is the use of the Internet as a distribution channel for the inexpensive transfer of digital data. For example, many companies already distribute marketing materials, technical product information, stock information, or other types of less sensitive materials over the Internet, either to potential customers or internally within the company. It would also be desirable to distribute more proprietary types of digital data, such as digitized audio tracks, literary works in digital form, or digital images and videos. If these types of data could be securely distributed to consumers, then an entirely new market for these works could be created. For example, rather than purchasing music albums from a local retail outlet, consumers could download the digital data across the Internet and then write this data to their local CD-R, thus creating their own compact disks. Similarly, rather than renting a video tape from a local video retailer, consumers could download the digital version and then play it locally on their computer screens or televisions.

The digital nature of these works, however, makes it imperative that they be secured against unauthorized copying. With no generation loss and the relative ease with which digital files may be copied and distributed, even a single unprotected copy could spawn a multitude of pirated versions, significantly reducing the demand for authorized copies.

As a result, a fair amount of work has focused on securing the Internet as a communications link. Advances in cryptography and related technologies, such as digital certificates and secure digital envelopes have significantly reduced the threat of piracy during the transmission of digital data over the Internet. For example, if a consumer wished to listen to a soundtrack at home, the soundtrack could be encrypted and then transmitted over the Internet to the consumer. The encryption would be a significant deterrent to unauthorized copiers trying to intercept the transmission.

More problematic, however, is what happens once the encrypted soundtrack arrives at the consumer's local computer. If the consumer is authorized to play the soundtrack or make a single copy of the soundtrack, for example, then the soundtrack must be decrypted at some point. When the encryption is removed, the soundtrack will be vulnerable to unauthorized copying.

Thus, there is a need for systems and methods which allow the transfer of digital data over insecure communications links and further allow the writing of this data to local media for the purpose of making authorized copies, while simultaneously preventing the unauthorized copying of that data during transfer and writing.

SUMMARY OF THE INVENTION

In accordance with the present invention, a device for securely decrypting and writing an encrypted digital file to a local recordable storage medium includes a first decryption engine, a first local memory, an encryption engine, a local storage medium, a second decryption engine, and a second local memory.

The first decryption engine incrementally decrypts the encrypted digital file, a portion at a time such that only substantially less than all of the digital file is in decrypted form at any instant. The various portions may be further preprocessed, such as being decompressed. These decrypted portions are buffered by the first local memory. The encryption engine then re-encrypts the decrypted portions from the first local memory to form an intermediate file, which is stored in the local storage medium. The second decryption engine incrementally decrypts the intermediate file, buffering the decrypted portions in the second local memory until they can be written to a recordable storage medium. Again, the incremental decryption means that substantially less than all of the digital file is in decrypted form at any instant, thus significantly reducing the risk of unauthorized copying. The use of the intermediate file is beneficial because it allows the original encrypted file to be encrypted using a strong encryption algorithm and preprocessed using computationally intensive methods which would not otherwise support the data flow rates required for certain types of recordable storage media.

In further accordance with the invention, a method for securely decrypting and writing an encrypted digital file to a recordable storage medium includes the following steps. The encrypted digital file is preprocessed and re-encrypted to form an intermediate file. Preprocessing includes incremental decryption. The intermediate file is stored to a local storage medium. The intermediate file is then incrementally decrypted and written to a recordable storage medium. Once the file is written, the intermediate file is erased.

In a second embodiment of the invention, a device for securely distributing an encrypted digital file to a recordable storage medium includes a decryption engine and a local memory. The encrypted digital file includes individually encrypted portions, and the decryption engine incrementally decrypts the encrypted portions. The local memory buffers the decrypted portions for subsequent writing to the recordable storage medium, but only stores substantially less than all of the individually encrypted portions of the digital file in decrypted form at any instant.

BRIEF DESCRIPTION OF THE DRAWING

The invention has other advantages and features which will be more readily apparent from the following detailed description of the invention and the appended claims, when taken in conjunction with the accompanying drawing, in which:

DETAILED DESCRIPTION OF THE PREFERRED EMBODIMENTS

Figure 1:
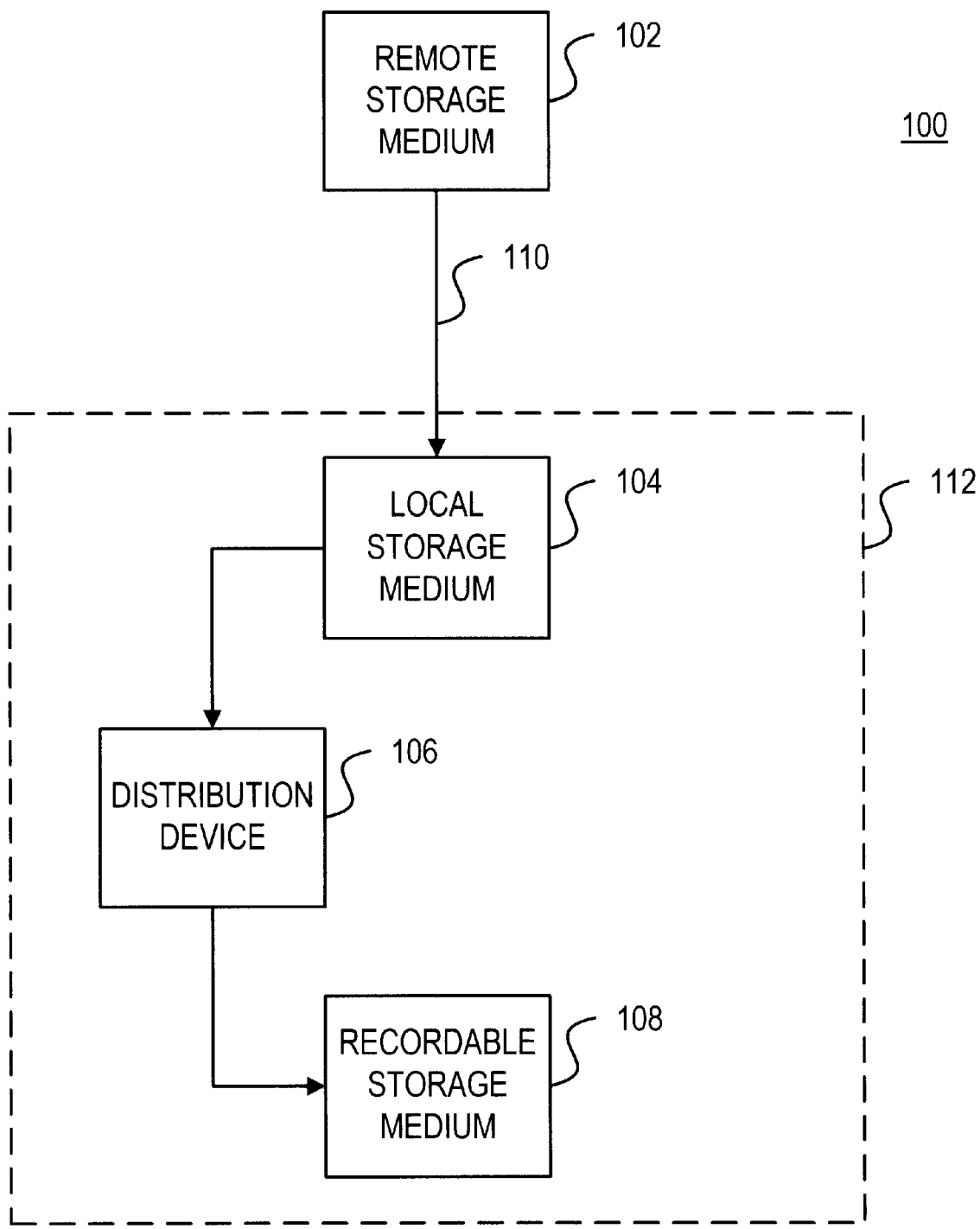
FIG. 1 is a block diagram of a system 100 utilizing the present invention.

FIG. 1 is a block diagram of a system 100 utilizing the present invention. The system 100 includes a remote storage medium 102, a local storage medium 104, a distribution device 106, and a recordable storage medium 108. The remote storage medium 102 is coupled to the local storage medium 104 by an insecure communications link 110. The local storage medium is coupled to the recordable storage medium 108 via the distribution device 106. The system 100 securely distributes digital files from the remote storage medium 102 to the recordable storage medium 108 while reducing the risk of unauthorized copying of the digital file during transmission across insecure link 10 and during transmission from local storage medium 104 to recordable storage medium 108.

In a preferred embodiment, the remote storage medium 102 is a collection of different digital audio files in PCM format which is owned or controlled by a merchant. For example, the collection of audio files may include various soundtracks, popular songs, complete albums, or any combination of these. Further in this embodiment, the insecure communications link 110 is the Internet and the recordable storage medium 108 is a recordable compact disk (CD-R). A customer wishes to make a copy of one of the digital audio files onto his CD-R medium 108. Hence, the digital audio file must be transferred from the remote storage medium 102 across Internet 110 to the customer's local system 112 for eventual writing to CD-R medium 108. Since the customer has only purchased one copy of the digital audio file, the merchant would like to insure that distribution of the digital file is secure in order to prevent unauthorized copies of the digital audio file. For example, if an unprotected version of the digital audio file is transmitted across the insecure Internet 110, then unauthorized copies may be made during transmission. As another example, if a secured version of the digital audio file is transmitted across the Internet 110 but the protection is then removed at the customer's system 112, then the customer may have access to the unprotected digital audio file and may make additional, unauthorized copies.

In this embodiment, the system 100 operates as follows. The local storage medium 104 is the hard drive on the customer's home computer. The merchant distributes the digital audio file in encrypted and compressed form across the Internet 110 to the customer's hard drive 104. The encryption prevents any unauthorized copying during transmission across the Internet 110 and also prevents unauthorized copying while the digital audio file resides on the hard drive 104. The compression allows for more efficient transmission of the digital audio file. When the customer is authorized to make a copy of the digital audio file onto his CD-R medium 108, the distribution device 106 decrypts the digital audio file on hard drive 104 and writes the decrypted file to the CD-R medium 108. However, the distribution device 106 does not decrypt the entire digital audio file at once. Rather, it incrementally decrypts the digital audio file. That is, the digital audio file is decrypted a small portion at a time so that substantially less than the entire digital audio file resides in the customer's computer in unencrypted form at any instant in time. This makes it significantly more difficult for the customer to make unauthorized copies of the digital audio file.

Figure 2:
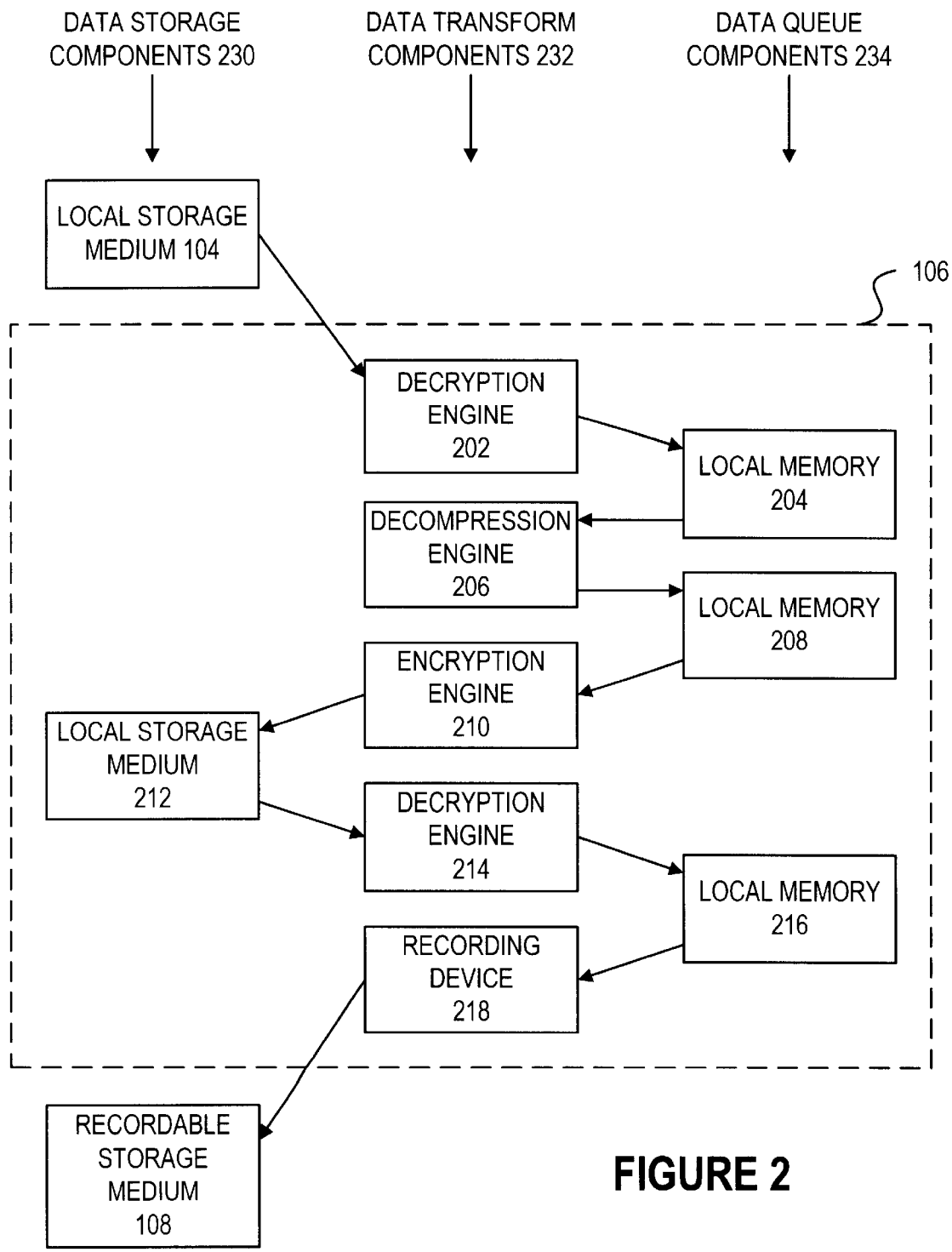
FIG. 2 is a block diagram of a preferred embodiment of the distribution device 106 of FIG. 1.

FIG. 2 is a block diagram of a preferred embodiment of the distribution device 106 of FIG. 1. The distribution device 106 includes data storage components 230, data transform components 232, and data queue components 234. More specifically, a data storage components 230 include local storage medium 212; while the data queue components include local memories 204, 208 and 216. The data transform components include decryption engines 202 and 214, encryption engine 210, decompression engine 206, and recording device 218. Local storage medium 104 and recordable storage medium 108 are also data storage components 230, although they are not part of the distribution device 106.

In the preferred embodiment described previously with respect to FIG. 1, distribution device 106 resides primarily on the customer's home computer. The local storage medium 212 is the computer's hard drive, same as hard drive 104. The various local memories 204, 208, and 216 are portions of the computer's main memory which are temporarily allocated as buffers. The various data transform components 202, 206, 210, 214, and 218 may be implemented as software running on the computer or may be implemented in dedicated hardware.

The components of device 106 are coupled to form a pipeline for processing digital data. More specifically, decryption engine 202 couples the hard drive 104 to local memory 204; decompression engine 206 couples local memory 204 to local memory 208; and encryption engine 210 couples local memory 208 to hard drive 212. The decryption engine 214 then couples hard drive 212 to local memory 216; and recording device 218 couples local memory 216 to the recordable storage medium 108.

Figure 3:
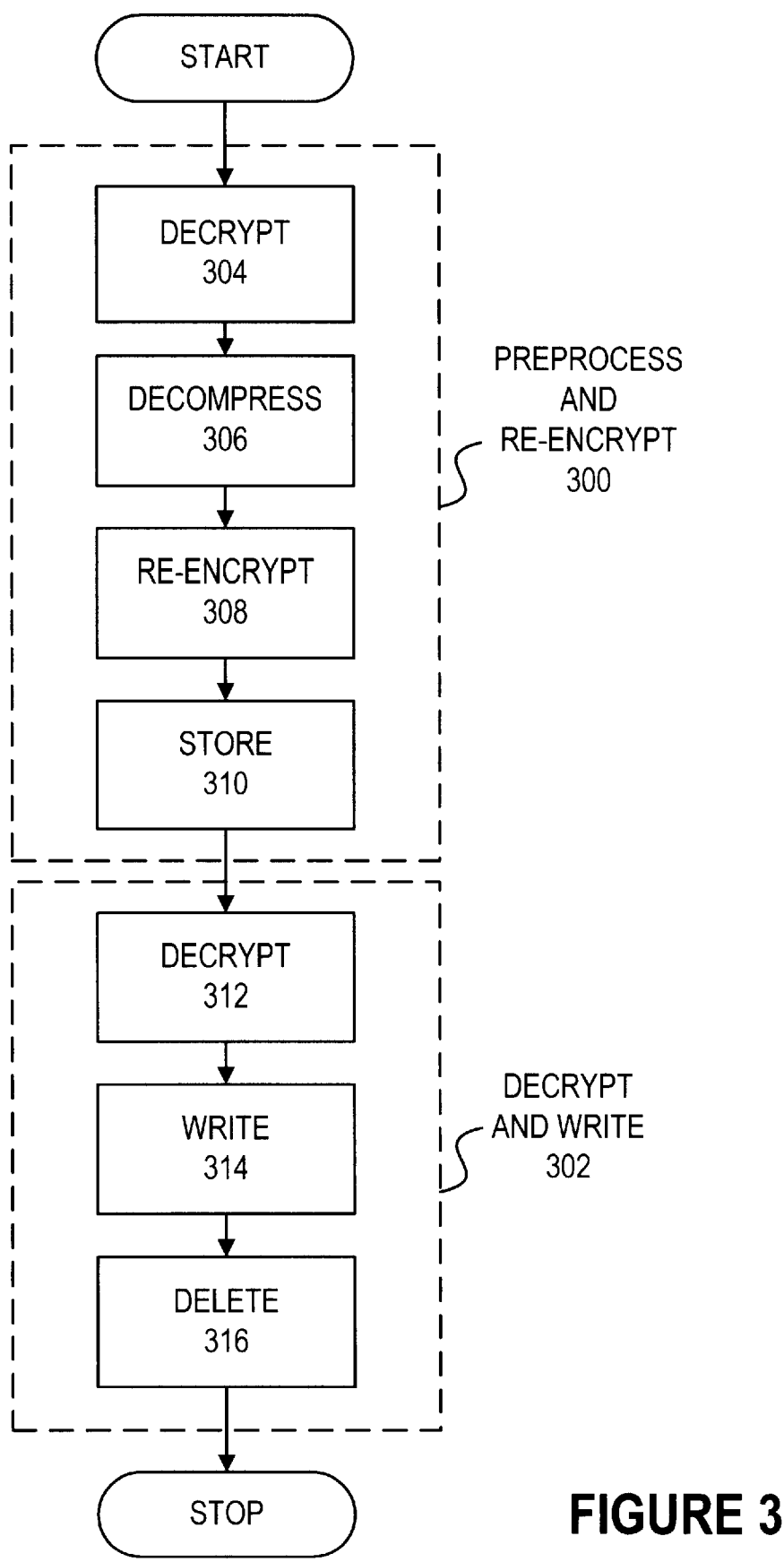
FIG. 3 is a flow diagram of a method for operating the distribution device 106 of FIG. 2.

FIG. 3 is a flow diagram of a method for operating the distribution device 106 of FIG. 2. The method includes two major steps 300 and 302. As described previously, the hard drive 104 contains a first encrypted and compressed version of the digital audio file, which shall be referred to as a source file for convenience. In a preferred embodiment, the digital audio file is compressed according to the AC-3 algorithm and then encrypted using the DES algorithm with a 56-bit key. The source file is stored on hard drive 104. For convenience, the format in which the source file is stored shall be referred to as the LA1 format. In step 300 of preprocessing and re-encrypting, the distribution device 106 transforms the encrypted and compressed source file into a second encrypted but not compressed version of the digital audio file, which shall be referred to as the intermediate file for convenience. The intermediate file is encrypted according to the RC4 algorithm using a 40-bit key. The RC4 encryption requires less computational power to decrypt than 56-bit DES encryption. Put in another way, given the same computational power, RC4 decryption can support a faster data flow rate than DES decryption. The intermediate file is stored to hard drive 212 in a format commonly referred to a the WAV format. In step 302 of decrypting and writing, the distribution device 106 takes this intermediate file from hard drive 212 and writes an unencrypted version of it to CD-R medium 108 using standard Red Book audio format. The intermediate file is then deleted from the hard drive 212, leaving only the more strongly encrypted source file on the customer's local computer.

The use of the intermediate digital audio file results in several advantages. First, it is instructive to note that the CD-R recording process requires a steady, continuous flow of data, resulting in a data pull and a minimum required data flow rate for the rest of the data flow pipeline. Data is written to the CD-R medium 108 in response to its requirements. Hence, if the source file on hard drive 104 was written directly to the CD-R medium 108, the encryption and compression algorithms used would be limited to those which could be decrypted and decompressed quickly enough to support the minimum data flow rates required for writing to CD-R medium 108. The use of the intermediate file allows the use of stronger (but slower) encryption and compression algorithms for the source file while still supporting the data flow requirements for writing to the CD-R medium 108 and without significantly compromising security. This is because the computational requirements for the decryption and decompression of the source file are now off-loaded to step 300, which may be performed independently of step 302 and therefore independently of the data flow requirements of CD-R medium 108. As a result, the decryption and decompression of the source file may be more computationally intensive than would otherwise be possible. In fact, in the preferred embodiment described above, the preprocessing steps 300 are characterized by a data flow rate which is less than that of the decrypting and writing steps 302.

Figure 4:
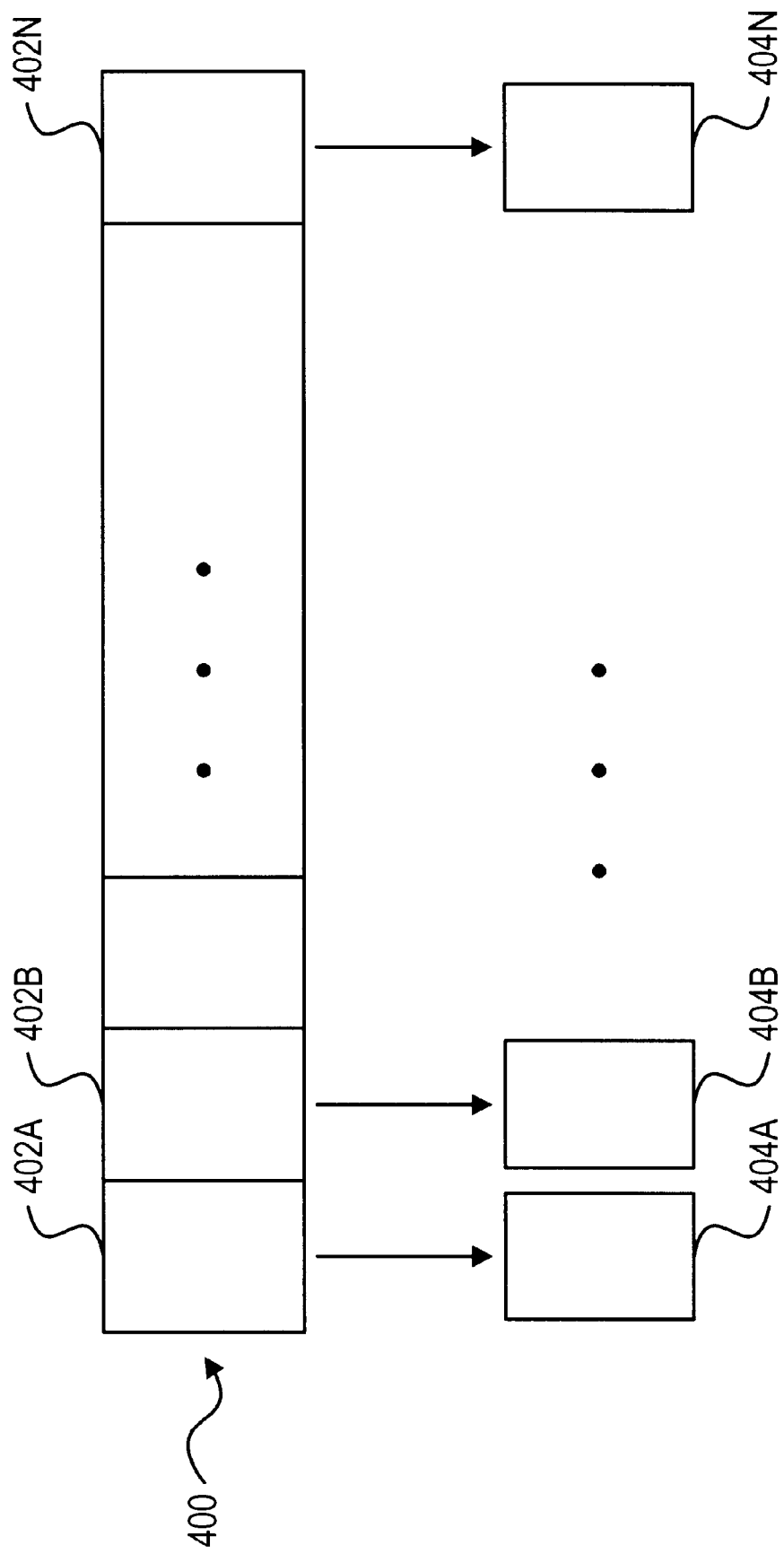
FIG. 4 is a data transformation diagram illustrating the decryption step 304 of FIG. 3

Referring again to FIGS. 2 and 3, the following is a more detailed description of the method illustrated in FIG. 3. The decryption engine 202 first decrypts 304 the source file in LA1 format on the hard drive 104 according to 56-bit DES, passing the results to local memory 204. The decryption engine 202, however, does not decrypt the entire source file at once and then store the entire file in decrypted form to local memory 204. Rather, the decryption engine 202 incrementally decrypts the source file. FIG. 4 is a data transformation diagram illustrating the incremental nature of decryption step 304 of FIG. 3. The source file 400 is subdivided into portions 402A, 402B, . . . 402N (collectively, 402). The decryption engine 202 individually decrypts each of these portions 402A, 402B, . . . 402N to produce corresponding decrypted portions 404A, 404B, . . . 404N (collectively, 404). As each decrypted portion 404 is produced, it is passed to local memory 204 for flier processing. Local memory 204 acts as a pipelined buffer between decryption engine 202 and decompression engine 206. In this embodiment, the size of the portions 402 and 404 are driven by the requirements of decompression engine 204, and the capacity of the local memory 204 is larger than the size of the portions 402 and 404 so that the local memory can store several portions 404 simultaneously. In a preferred embodiment, each portion 402 or 404 may contain approximately 1500 samples of digital audio data.

Decompression engine 206 takes these decrypted but still compressed portions 404 from local memory 204 and individually decompresses them according to the AC-3 algorithm. In other words, decompression engine 206 incrementally decompresses the source file. Decompression engine 206 then stores these decrypted and decompressed portions to local memory 208, which functions as a pipelined buffer to encryption engine 210. After each portion 404 is decompressed 306, it may be deleted from local memory 204. Thus, at any instant in time, local memory 204 only contain a small portion of the entire digital audio file in decrypted form.

Encryption engine 210 takes the decompressed and decrypted portions in local memory 208 and incrementally re-encrypts them according to 40-bit RC4, storing the results in hard drive 212. Local memory 208 operates similarly to local memory 204. At any instant in time, local memory 208 only contain a small portion of the entire digital file. Hard drive 212 accumulates the re-encrypted portions of the digital audio file produced by encryption engine 210, thus producing an encrypted version of the entire digital audio file, which is the intermediate file in WAV format.

Decryption engine 214 then incrementally decrypts 312 the intermediate file stored in hard drive 212, in a manner similar to decryption engine 202. The decrypted portions are stored to local memory 216. Again, only a small portion of the digital audio file is stored in local memory 216 in decrypted form at any instant. Recording device 218 then writes the decrypted portions to the CD-R medium 108. Once the entire digital file is written to the recordable storage medium 108, the intermediate file in hard drive 212 is deleted 316.

In step 302, writing 314 to the CD-R medium 108 requires a steady flow of data. Therefore, local memory 216 should have sufficient data to supply recording device 218 or else a buffer underrun will occur. Accordingly, the capacity of local memory 216 and the size of the portions used in step 302 are selected in part to prevent buffer underrun errors. In a preferred embodiment, the capacity of local memory 216 is approximately 500 Kbytes, the capacity of local memory 208 is approximately 200 Kbytes, and the capacity of local memory 204 is approximately 20 Kbytes.

In a preferred embodiment, the addressable memory of the customer's computer includes software objects useful for implementing the above functionality. The object model is implemented as a collection of object oriented components that each consist of one or more C++ classes. Objects of these classes are instantiated and destroyed dynamically, as necessary, to achieve the desired functionality.

Figure 5:
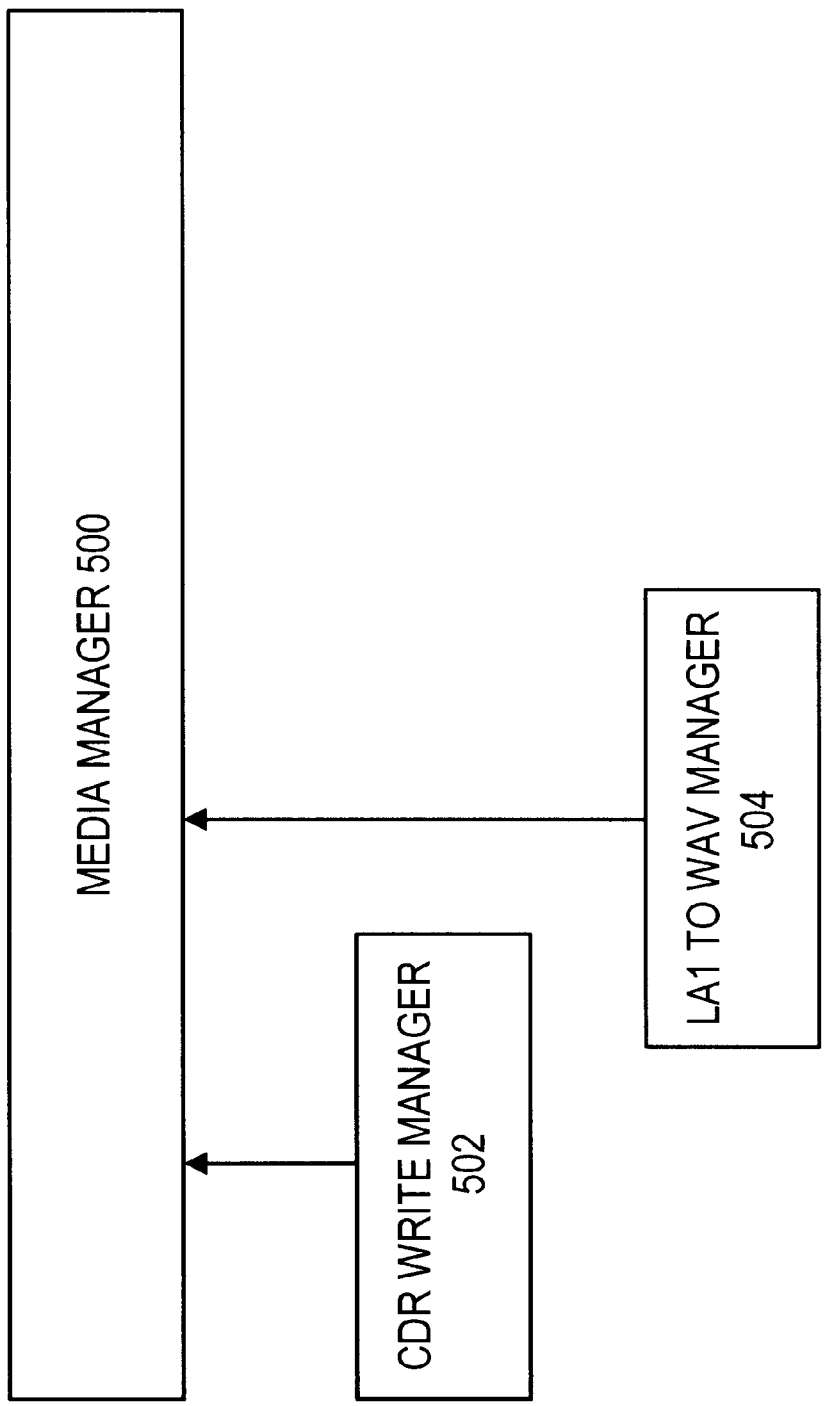
FIG. 5 is a diagram illustrating high level object classes used to implement the functionality in FIGS. 2 and 3.

FIG. 5 is a diagram illustrating high level object classes used to achieve the functionality in FIGS. 2 and 3. The MediaManager class 500 is a base class from which various subclasses are derived. These subclasses include the CDRWriteManager subclass 502 and the LA1 to WAVManager subclass 504. Each of the subclasses 502 and 504 implements a functionality for transferring data between two of the data storage components 230. For example, an instantiation of the CDRWriteManager subclass 502 implements step 302 of FIG. 3, which transfers data from the hard drive 212 to the recordable storage medium 108; and an instantiation of the LA1 to WAVManager subclass 504 implements step 300 of FIG. 3, which transfers data from hard drive 104 to hard drive 212. Additional subclasses can be designed as needed to handle additional scenarios.

Figure 6:
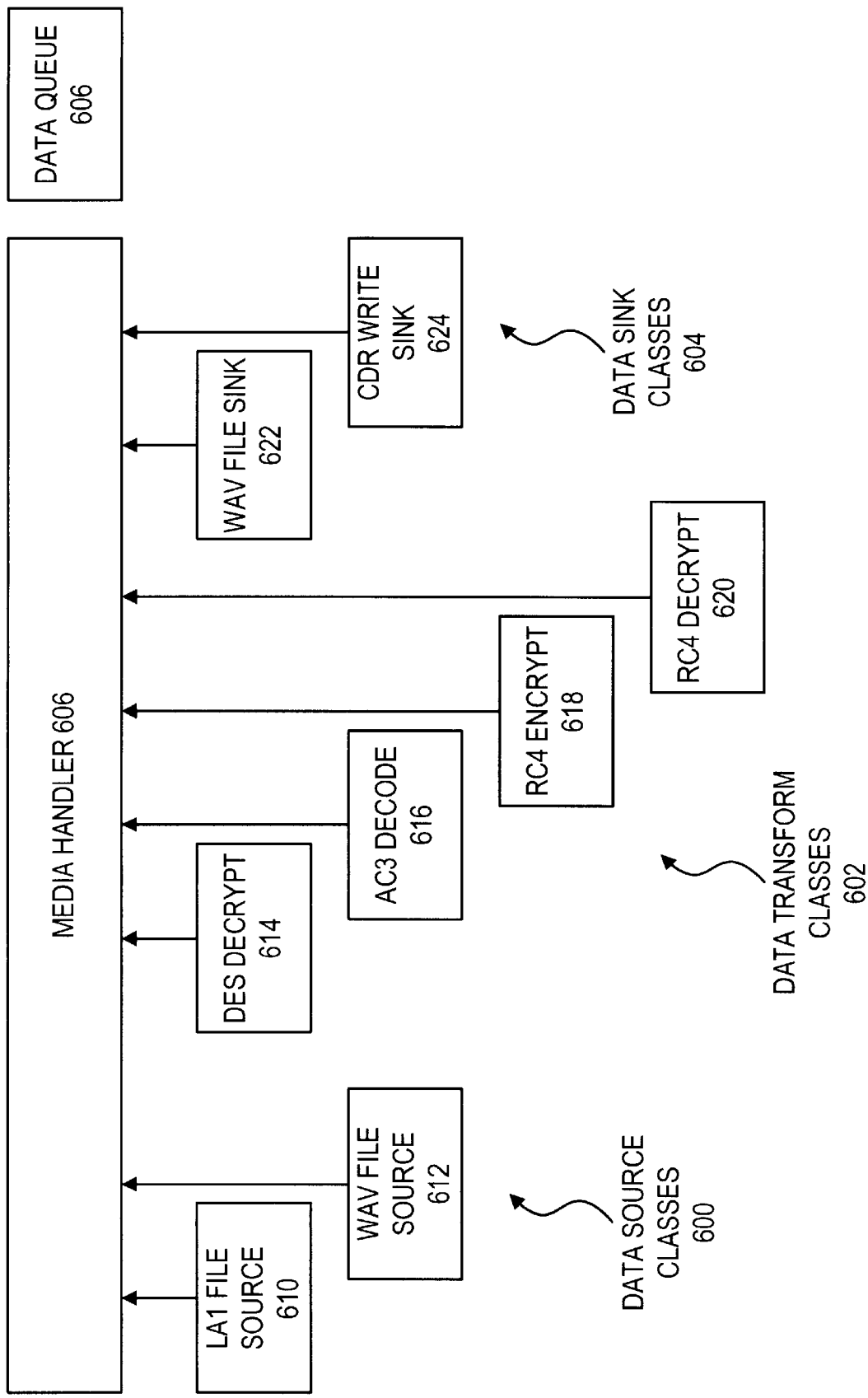
FIG. 6 is a diagram illustrating low level object classes used to construct the high level object classes of FIG. 5.

FIG. 6 is a diagram illustrating low level object classes used to construct the high level object classes of FIG. 5. The low level object classes may be divided into four groups: data source classes 600, data transform classes 602, data sink classes 604, and the DataQueue class 606. The data source 600, data transform 602, and data sink 604 classes are all subclasses of the DataHandler base class 606. Each MediaManager based object uses zero or more DataQueue objects and two or more DataHandler objects: a data source object, zero or more data transform objects, and a data sink object.

Referring to FIG. 2, the data source classes 600 and data sink classes 604 implement interfaces to the various data storage components 230. The data source classes 600 include the LA1FileSource subclass 610, and the WAVFileSource subclass 612. Instantiations of these subclasses would handle the reading of data from files in the LA1 or WAV format, respectively. Similarly, data sink classes 604 include the WAVFileSink subclass 622 and the CDRWriteSink subclass 624. Instantiations of these subclasses would handle the writing of data to a file in LA1 format or to a CD-R medium, respectively.

The data transform classes 602 include the following subclasses of the DataHandler base class 606: DESDecrypt 614, AC3Decode 616, RC4Encrypt 618, and RC4Decrypt 620. Instantiations of these various subclasses implement the functionality of the various data transform components 232.

The DataQueue class 606 implements the functionality of the various data queue components 234 and is designed to buffer data passed between two DataHandler derived objects.

Again, additional classes may be designed to handle additional scenarios.

Figure 7:
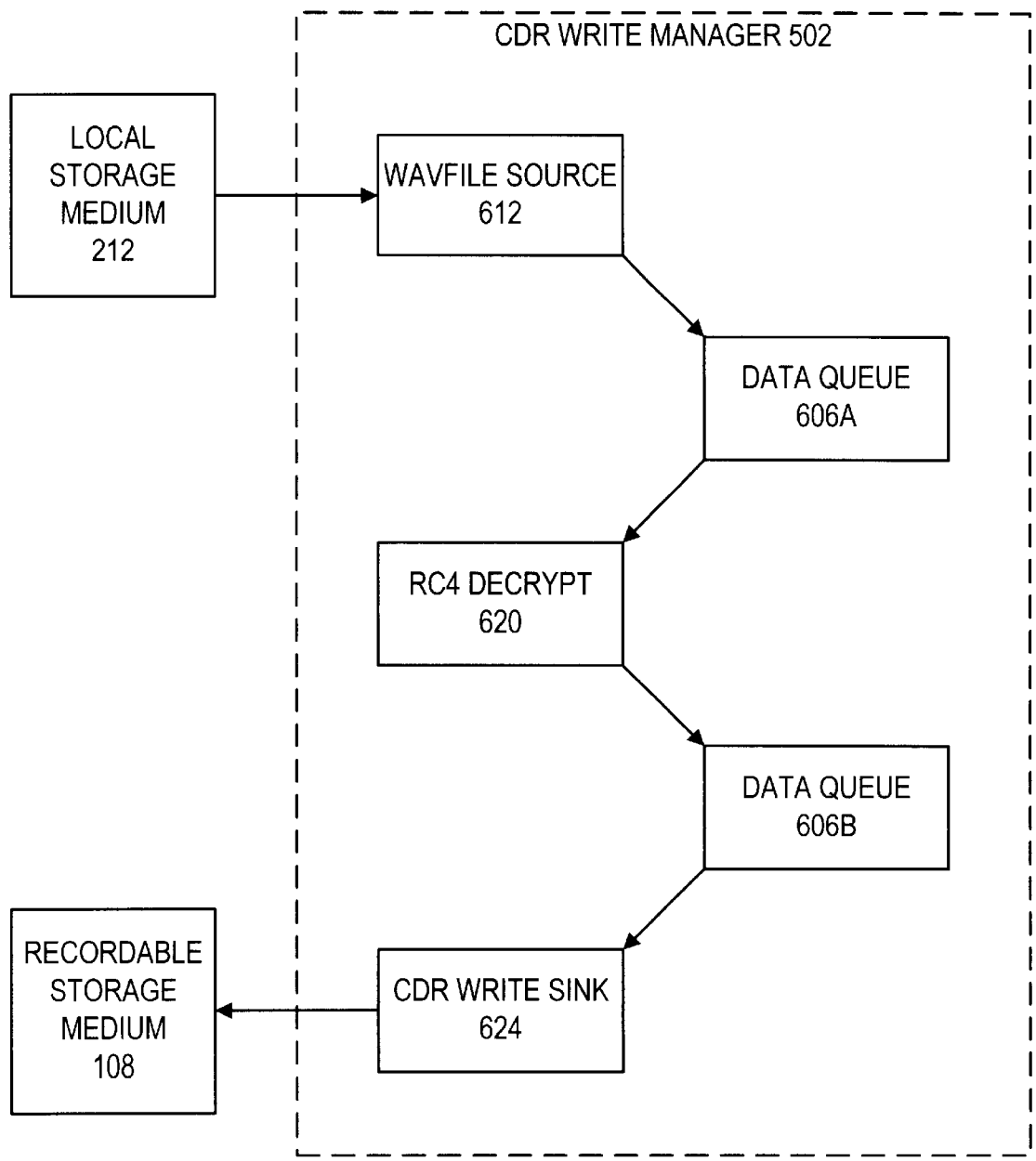
FIG. 7 is a block diagram of an exemplary instantiation of the CDWriteManager subclass 502 of FIG. 5.

FIG. 7 is a block diagram of an exemplary instantiation of the CDRWriteManager subclass 502 of FIG. 5. The principles and approaches disclosed in explaining this example are equally applicable to LA1 to WAVManager subclass 504 or to other MediaManager subclasses. The instantiation of CDRWriteManager 502 includes the following objects from FIG. 6: WAVFileSource 612, RC4Decrypt 620, CDRWriteSink 624, and DataQueues 606A and 606B.

These objects implement step 302 of decrypting and writing and have a close correspondence with the various components and steps shown in FIGS. 2 and 3. More specifically, WAVFileSource object 612 and DataQueue object 606A provide the interface to hard drive 212. RC4Decrypt object 620 corresponds to the decryption engine 214 and implements decryption step 312. DataQueue object 606B corresponds to the local memory 216. CDRWriteSink 624 corresponds to the recording device 218 and writes 314 to CD-R medium 108.

The above implementation could be achieved without using multiple threads of execution. However, a preferred embodiment employs multiple threads in order to control the data flow from the WAVFileSource object 612 to the CDRWriteSink object 624. The following threading conventions are employed. Basically, the data flow is controlled by queue space availability. It is the responsibility of the CDRWriteManager object 502 to ensure that adequate queue space is available in each of the DataQueue objects 606A and 606B to ensure smooth data flow. An initial priming phase may be used to queue up data. Then, each DataHandler based object 612, 620 and 624 will generally process and pass on as much data as possible, responsive to the availability of queue space in DataQueues 606A and 606B. One exception to this will be data source subclasses 500 which receive new data asynchronously. These subclasses will employ a "high water mark" to ensure that there is always queue space available for newly arrived data. If a DataHandler based object 612, 620 or 624 runs out of output queue space or reaches its high water mark, then, if possible, it will block until more queue space becomes available. Generally, after the initial priming phase or after a state of queue saturation has been reached, data flow will proceed one portion at a time as data is read from the DataQueue objects 606A or 606B and consumed by the intermediate RC4Decrypt object 620 or the CDRWrite Sink object 624. Whenever space is freed up in DataQueue 606A or 606B, its supplier is signaled. This signal either causes more data to be written into DataQueue 606A or 606B or causes one or more blocked threads to become signaled.

Figure 8:
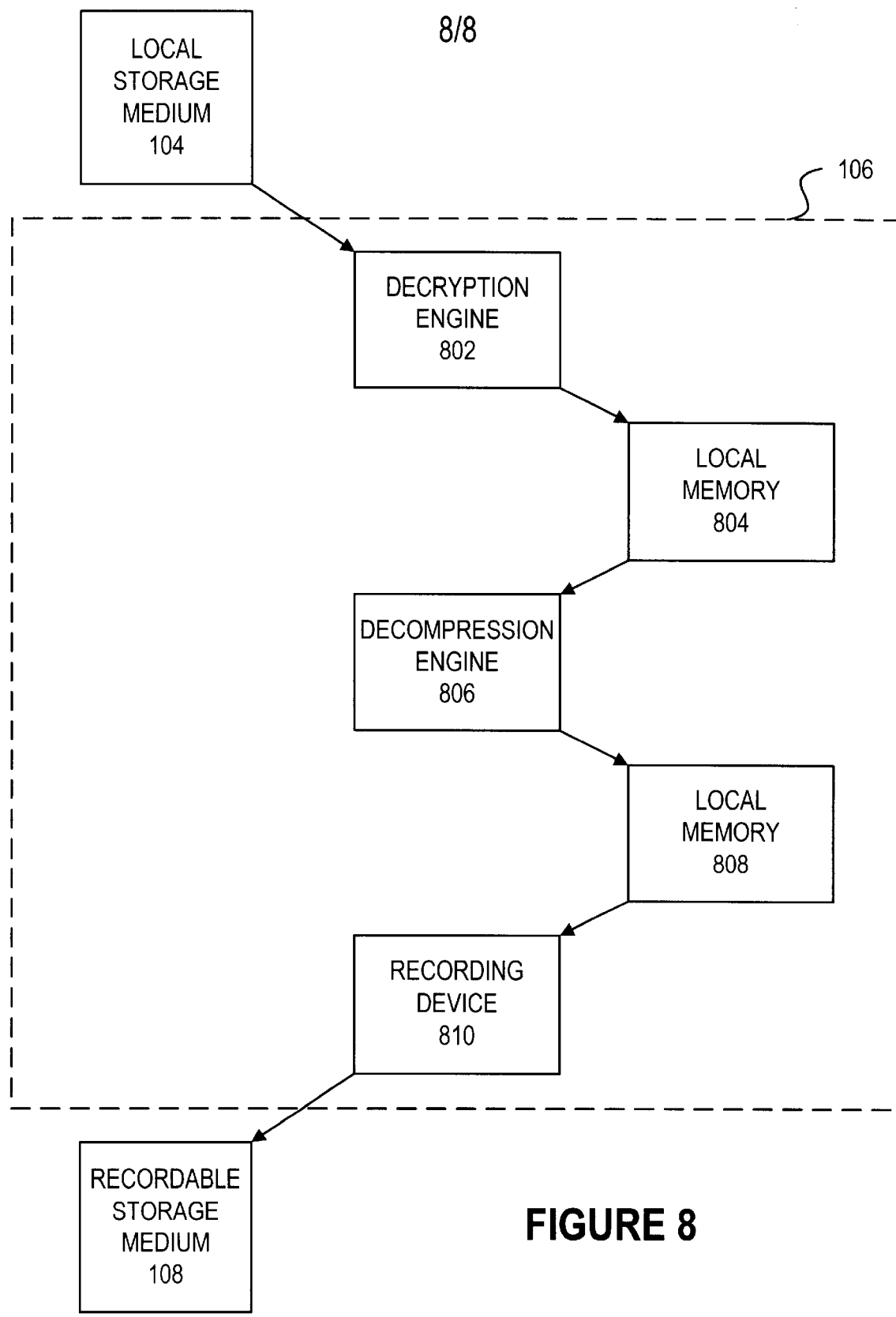
FIG. 8 is a block diagram of a second preferred embodiment of the distribution device 106 of FIG. 1.

FIG. 8 is a block diagram of a second preferred embodiment of the distribution device 106 of FIG. 1. In this embodiment, the digital file in local storage medium 104 is written directly to recordable storage medium 108 without the use of an intermediate file or intermediate local storage such as local storage medium 212. This approach is appropriate when the components can meet the required data flow requirements of the recordable storage medium 108. For example, if decryption engine 802 and decompression engine 806 are fast enough to support recording device 810, or if recording device 810 does not require a continuous data flow rate or does not record in real-time, then the distribution device 106 of FIG. 8 may be appropriate.

The device 106 includes a decryption engine 802, decompression engine 806, recording device 810, and local memories 804 and 808. The components 802–810 are similar to the components shown in FIG. 2 and are coupled in a similar manner. More specifically, decryption engine 802 couples the local storage medium 104 to local memory 804; decompression engine 806 couples local memory 804 to local memory 808; and recording device 810 couples local memory 808 to the recordable storage medium 108.

The device 106 operates as follows. The decryption engine 802 incrementally decrypts the source digital files stored in hard drive 104. Decompression engine 806 decompresses these decrypted portions, resulting in decrypted and decompressed portions of the source file. Recording device 810 then writes these portions to recordable storage medium 108. Local memories 804 and 808 are used to buffer the data between the various data transform components 802, 806 and 810, as in the embodiment of FIG. 2. The object approach described previously in FIGS. 5–7 may also be used to implement this embodiment.

Although the invention has been described in considerable detail with reference to certain preferred embodiments, other embodiments are possible. For example, the preferred embodiment has been described with respect to the distribution of digital audio files. The invention may also be used with other types of files such as video files, image files, or data files.

Nor is the invention limited to the specific formats or algorithms described. For example, data formats other than the LA1 format, WAV format, and standard Red Book format may be used to store data. Similarly, encryption algorithms besides DES and RC4 and compression algorithms besides AC-3 may be used. In fact, the data transform components 232 and their corresponding steps are not limited to encryption and compression. For example, the preprocessing portion of step 300 could include filtering, equalization, volume normalization, re-sampling, or mixing of different audio tracks. Changing between different formats or converting between mono and stereo could also be achieved. Further security measures, such as embedding digital data which identifies a specific customer or transaction into the audio track for security purposes, might also be included in the preprocessing portion of step 300. Other functions, such as time interpolation, blending of different video streams, or rendering video based on three-dimensional models, might be used for video images. Generally speaking, the preferred embodiment of FIG. 2 may be appropriate whenever the data transform from the local storage medium 104 to the local storage medium 212 is computationally more intensive than the transform from medium 212 to recordable storage medium 108. As a final example, the recordable storage medium 108 is not limited to CD-R. Other recordable storage media 108 include, for example, DVD, cassette tape, or various types of computer disk drives.

Referring to FIG. 1, in the preferred embodiment, the insecure communications link 110 was the Internet and all of the components within the customer's system 112 resided on the customer's local computer. Neither of these is a requirement for the invention either. For example, the local storage medium 104 could reside on a local network server while the recordable storage medium 108 was a peripheral on the customer's computer. As another example, the components on the customer's system 112 may be completely unrelated to a home computer. Instead, the devices 104, 106 and 108 could be implemented in consumer electronics such as a television-based Internet browser. As one final example, the insecure communications link 110 could be a wireless communications network rather than the Internet.

Finally, in the scenario of the preferred embodiment, a merchant desired to distribute a data file to a customer. This relationship also is not required. For example, system 100 might represent the intranet of a corporation which desired to distribute sensitive files from a remote storage medium 102 at a central office to the recordable storage medium 108 at one of its local offices. Therefore, the spirit and scope of the appended claims should not be limited to the description of the preferred embodiments contained herein.

What is claimed is:

1. A method for securely decrypting and writing a first encrypted digital file to a recordable storage medium, comprising:
    preprocessing and re-encrypting the first encrypted digital file to form a second encrypted digital file so that substantially less than all of the first encrypted digital file is in decrypted form at any instant, said preprocessing including decrypting the first encrypted digital file, said preprocessing further characterized by a first data flow rate;
    storing the second encrypted digital file to a local storage medium;
    decrypting the second encrypted data file;
    writing results of decrypting the second encrypted digital file to a recordable storage medium so that substantially less than all of the results of decrypting the second encrypted digital file is in decrypted and unwritten form at any instant, said decrypting and writing characterized by a second data flow rate which is greater than the first data flow rate; and
    responsive to decrypting and writing the results of decrypting the second encrypted digital file to the recordable storage medium, deleting the second encrypted digital file from the local storage medium.

2. The method of claim 1 wherein:
    the first encrypted digital file is a first encrypted and compressed digital file; and
    preprocessing the first encrypted digital file further includes decompressing the first encrypted digital file.

3. The method of claim 1 wherein:
    decrypting the first encrypted digital file is characterized by a third data flow rate; and
    decrypting the second encrypted digital file is characterized by a fourth data flow rate which is greater than the third data flow rate.

4. The method of claim 3 wherein:
    decrypting the first encrypted digital file comprises decrypting the first encrypted digital file according to DES encryption; and
    decrypting the second encrypted digital file comprises decrypting the second encrypted digital file according to RC4 encryption.

5. The method of claim 1 wherein:
    the first data flow rate is less than a minimum data flow rate required to write to the recordable storage medium.

6. The method of claim 1 wherein:
    the first encrypted digital file includes a plurality of first individually encrypted portions;
    preprocessing and re-encrypting the first encrypted digital file comprises:
        incrementally decrypting the first encrypted portions in a first local memory;
        re-encrypting the first individual decrypted portions to form the second encrypted digital file including a plurality of second individually encrypted portions; and
        responsive to re-encrypting the first individual decrypted portions, deleting the re-encrypted portions from the first local memory so that substantially less than all of the plurality of first individually encrypted portions of the digital file are available in decrypted form in the first local memory at any instant; and
    decrypting and writing the second encrypted digital file comprises:
        incrementally decrypting the second encrypted portions in a second local memory;
        writing the second individual decrypted portions to the recordable storage medium; and
        responsive to writing the second individual decrypted portions, deleting the written portions from the second local memory so that substantially less than all of the plurality of second individually encrypted portions of the digital file are available in decrypted form in the second local memory at any instant.

7. The method of claim 1 wherein:
    preprocessing the first encrypted digital file further includes embedding digital data into said digital file for security purposes.

8. A device for securely decrypting and writing a first encrypted digital file to a recordable storage medium, comprising:
    a first decryption engine adapted to receive the first encrypted digital file for incrementally decrypting first portions of the first encrypted digital file;
    a first local memory coupled to receive the first decrypted portions from the first decryption engine for buffering the first decrypted portions, the first local memory storing only substantially less than all of the first encrypted digital file in decrypted form at any instant;
    a first encryption engine coupled to receive the first decrypted portions from the first local memory for re-encrypting the first decrypted portions into a second encrypted digital file;

a local storage medium coupled to receive the second encrypted digital file from the first encryption engine for storing said file;

a second decryption engine coupled to receive the second encrypted digital file from the local storage medium for incrementally decrypting second portions of the second encrypted digital file; and a second local memory coupled to receive the second decrypted portions from the second decryption engine for buffering the second decrypted portions for writing to a recordable storage medium, the second local memory storing only substantially less than all of the second encrypted digital file in decrypted form at any instant.

9. The device of claim 8 wherein:

the first encrypted digital file is a first encrypted and compressed digital file; and the device further comprises a decompression engine coupled to the first decryption engine and to the first local memory, for decompressing the first decrypted portions from the decryption engine.

10. The device of claim 8 wherein:

the first decryption engine is more computationally powerful than the second decryption engine.

11. The device of claim 10 wherein:

a capacity of the second local memory is larger than a capacity of the first local memory;

and the capacity of the first local memory is larger than a size of the first and of the second decrypted portions.

* * * * *